United States Patent
Hundal et al.

(10) Patent No.: US 7,366,128 B2
(45) Date of Patent: Apr. 29, 2008

(54) SYSTEM AND METHOD FOR AVOIDING INTERFERENCE BETWEEN TWO COMMUNICATIONS SYSTEMS

(75) Inventors: Sukhdeep S. Hundal, British Columbia (CA); Milosh Koprivica, British Columbia (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 947 days.

(21) Appl. No.: 10/429,763

(22) Filed: May 6, 2003

(65) Prior Publication Data

US 2004/0223467 A1 Nov. 11, 2004

(51) Int. Cl.
*H04Q 7/00* (2006.01)
(52) U.S. Cl. ............ 370/328; 370/338; 370/329; 455/63.1; 455/501
(58) Field of Classification Search ........... 370/328, 370/329, 338; 455/552.1, 63.1, 501
See application file for complete search history.

(56) References Cited

U.S. PATENT DOCUMENTS

| | | | |
|---|---|---|---|
| 5,625,888 A | | 4/1997 | Rüther et al. |
| 5,627,823 A | | 5/1997 | Pillekamp |
| 6,895,255 B1 | * | 5/2005 | Bridgelall ............ 455/552.1 |
| 6,993,358 B2 | * | 1/2006 | Shiotsu et al. ......... 455/552.1 |
| 2003/0045283 A1 | * | 3/2003 | Hagedoorn ............. 455/426 |
| 2003/0060206 A1 | * | 3/2003 | Sointula et al. ......... 455/450 |
| 2003/0069048 A1 | * | 4/2003 | Liu et al. ............... 455/569 |
| 2004/0022210 A1 | * | 2/2004 | Frank et al. ........... 370/328 |

FOREIGN PATENT DOCUMENTS

| | | |
|---|---|---|
| GB | 2 355 893 | 5/2001 |
| WO | WO 98/44667 | 10/1998 |

OTHER PUBLICATIONS

GB Search Report dated Oct. 5, 2004.

* cited by examiner

*Primary Examiner*—Danh Le
(74) *Attorney, Agent, or Firm*—Paul Hastings Janofsky & Walker LLP

(57) ABSTRACT

A system and method for avoiding mutual interference between two communications system is disclosed. One embodiment of the invention provides a system that includes a fixed unit and a portable unit. The fixed unit has a fixed transceiver. The portable unit has a portable transceiver. The fixed transceiver and the portable transceiver are members of a first RF system of the first RF system. The portable transceiver is configured to communicate with the fixed transceiver via a first RF link of the first RF system. The system further includes an additional transceiver. The additional transceiver is configured to communicate with a headset via a second RF link of a second RF system. The system further includes a processor that is coupled to one of the fixed transceiver, the portable transceiver, and the additional transceiver. The processor is configured to avoid interference between the first RF link and the second RF link. The interference can be avoided by coordination between the first RF system and the second RF system. Alternatively, the interference can be avoided using signal or timing information from the second RF system. For example, RSSI obtained by the first RF system can be used to estimate or derive timing information of the second RF system, which can then be used by the first RF system to avoid interference with the second RF system.

14 Claims, 8 Drawing Sheets

SYSTEM AND METHOD FOR AVOIDING INTERFERENCE BETWEEN TWO COMMUNICATIONS SYSTEMS

BACKGROUND

1. Field of the Invention

The present invention relates generally to cordless telephony and more particularly to multiplexing time slots of two communications systems.

2. Background of the Invention

The ISM (Industrial Scientific Medical) band includes 902-928 MHz, 2.4-2.483 GHz, and 5.725-5.875 GHz frequency ranges. In the United States, the ISM band is unlicensed, which means that any of the ISM band frequency ranges can be used in a variety of applications as long as Federal (FCC) Communications Commission's part 15 rules are followed. One such application involve cordless telephones, which operates in each of the 900 MHz, 2.4 GHz, and 5.8 GHz ranges. Another application of the ISM band involves Bluetooth (BT) wireless technology, which uses the 2.4 GHz range frequencies.

BT technology is used by cellular telephones to enable communication between a cordless headset (e.g., one that can be worn on a user's head to enable "hands-free" operations) and a cellular telephone (e.g., one that can be attached to the user's belt). In such an application, a BT transceiver is housed within each of the cordless headset and the cellular telephone. Since BT transceivers and the cellular handset operate at different frequency bands, no significant interference is experienced.

Similar utility of the BT technology has not been made in cordless telephones. This is because incorporation of the BT technology in the cordless telephone sector would likely cause unacceptable interference in the 2.4 GHz ISM band. For example, in a situation in which a BT transceiver is located in a cordless handset that already has a conventional 2.4 GHz cordless telephone transceiver, significant interference can be expected. Due to the significant interference, an acceptable communications session between a BT headset and the cordless handset may not be achievable. Currently, there is no known solution that would enable a 2.4 GHz cordless telephone to communicate with a BT headset without interference.

U.S. Pat. No. 5,627,823 discloses a wire-free telecommunications system having multiple base stations and mobile units, each of which has a circuit arrangement to which a controlling program is assigned. The system includes radio links at predetermined frequencies and in multiple time slots in time-division multiplex channels. The controlling program uses only a subset of the time slots which do not follow one another directly which are predetermined for the radio links. In short, technology disclosed in this patent is related to time synchronization, but it is not related to multiplexing slots for two different/independent communications systems.

U.S. Pat. No. 5,625,888 discloses a process for combining transmitting/receiving devices of a cordless communications system to form a communicating unit. The disclosed technology is based upon coordination between two units by sending messages back and forth to achieve synchronization.

SUMMARY OF THE INVENTION

One embodiment of the invention provides a system that includes a fixed unit and a portable unit. For example, the system is a cordless telephone that includes a base unit and a cordless handset. The fixed unit has a fixed transceiver. The portable unit has a portable transceiver. The portable transceiver is configured to communicate with the fixed transceiver via a first RF link. The system further includes an additional transceiver. The additional transceiver can be coupled to the fixed unit or the portable unit. The additional transceiver is configured to communicate with a headset via a second RF link. The system further includes one or more processors that are coupled to one or more of the fixed transceiver, the portable transceiver, and the additional transceiver. The processor is configured to avoid interference between the first RF link and the second RF link. Preferably, each of the fixed transceiver and the portable transceiver is a cordless telephone transceiver. For example, the cordless telephone transceiver can be a World Digital Cordless Telephone standard (WDCT) transceiver. The additional transceiver is a preferably a BT transceiver.

Preferably, interference between the first RF link and the second RF link is avoided by multiplexing time slots associated with the first RF link and the second RF link. The multiplexing can be performed using timing information received from a system clock associated with the second RF link. Alternatively, the multiplexing can be performed using over the air synchronization between the first RF link and the second RF link.

In another embodiment, the invention provides a portable unit of a cordless telephone that includes a first transceiver, a processor coupled to the first transceiver, and a second transceiver. The first transceiver is configured to communicate with a fixed unit of the cordless telephone via a first RF link. The processor is configured to adjust timing information associated with the first transceiver. The second transceiver is configured to communicate with a headset via a second RF link. The processor adjusts time slots associated with the first transceiver to avoid interference between the first RF link and the second RF link.

Preferably, the portable unit further includes a second processor that is coupled to the second transceiver. The second processor is configured to provide timing information associated with the second transceiver to the first processor. The first processor can use the timing information to align frame start of the first transceiver to avoid the interference. Furthermore, the first processor can be configured to determine an RSSI (received signal strength indication). In this way, the first processor can use the RSSI to adjust transmit/receive timing of the first transceiver to avoid the interference. In another embodiment, the second transceiver can be embedded with the fixed unit for a direct connection from the fixed unit to the headset. Note that all the interference issues remain the same regardless of whether the second transceiver is embedded in the portable unit or the fixed unit.

In another embodiment, the invention provides a method that includes the following steps. First, timing information associated with a BT RF link between a handset of a cordless telephone and a BT headset is obtained. Second, using the timing information, frame start of a cordless RF link between the handset and a base unit of the cordless telephone are aligned to avoid mutual interference between the BT RF link and the cordless RF link. The aligning step can preferably involve timing a start of the cordless RF link's 10 ms frame with a start of the BT RF link's time slot of 625 μs. Furthermore, the BT RF link can use an HV2 packet for audio transmission with Tsco=4 and the HV2 packet carries 2.5 ms of audio. This is just one way of multiplexing the slots of two independent RF systems (e.g., a WDCT system and a BT system). There are other ways the slots or the frames can be aligned/multiplexed to avoid interference. The scope of the invention is not limited to this particular disclosed arrangement.

In another embodiment, the invention provides a method including (1) measuring an RSSI by a first communications system; (2) converting the RSSI into interfering signal transmit timing associated with a second communications system to estimate transmit timing associated with the second communications system; and (3) adjusting transmit/receive timing of the first communications system to avoid interference between the first communications system and the second communications system. Preferably, the first communications system uses a cordless technology. Preferably, the cordless technology involves a WDCT standard. Preferably, the second communications system uses a BT wireless technology.

In another embodiment, the invention provides a method including: (1) selecting a channel for taking an RSSI of a cordless telephone; (2) comparing the RSSI with a threshold; (3) converting the RSSI into an interfering signal transmit timing if the RSSI is greater than the threshold; (4) using the interfering signal transmit timing to estimate transmit timing associated with a BT transmission between a handset and a BT headset of the cordless telephone; and (5) adjusting transmit/receive timing of a cordless transmission between the handset and a base unit of the cordless telephone to avoid interference between the BT transmission and the cordless transmission.

Preferably, the method further includes determining a presence of any interference during the cordless transmission. Preferably, the determining is performed by measuring a Bit Error Rate associated with the cordless transmission. Preferably, the method further includes ending RF spectrum monitoring if the Bit Error Rate is greater than the threshold or interference is not detected for a predetermined amount of time. Preferably, the timing or the frame alignment happens on the base unit of the cordless telephone. The handset sends the timing information to the base unit and the base unit adjusts the timing and the handset uses the timing adjusted by the base unit. This is preferably because the base unit is usually the timing master in a multi-handset system.

In other embodiments, since the WDCT and BT transmissions use different time slots, one processor and one transceiver can be used to provide both WDCT and BT transmissions.

DETAILED DESCRIPTION OF THE INVENTION

The present invention relates to avoidance of mutual interference between two individual and independent communications systems. To help explain the invention, this disclosure describes how interference between a first RF link (e.g., a cordless transmission in general and a WDCT transmission in particular) and a second RF link (e.g., a BT RF transmission) can be avoided. This invention is not limited to WDCT and BT transmissions. It is specifically noted that the invention can be adapted for implementation in systems that use technologies other than the described WDCT and BT RF systems.

As discussed above, incorporation of BT technology in a cordless telephone that operates in the 2.4 GHz ISM band will likely cause interference between the BT link and the cordless link. The interference is due to the close proximity of the BT and cordless links.

One embodiment of the present invention solves this interference problem by adjusting the transmit/receive timing of the 2.4 GHz cordless link so that the cordless link and BT link do not transmit/receive at the same time. The cordless link can use, e.g., the WDCT standard, which was originally developed by Siemens, AG. The WDCT standard is a modification of Digital European Cordless Telephone DECT standard derived by adding frequency hopping in DECT TDMA based access. WDCT is commonly used for cordless telephones in North America.

Figure 1:
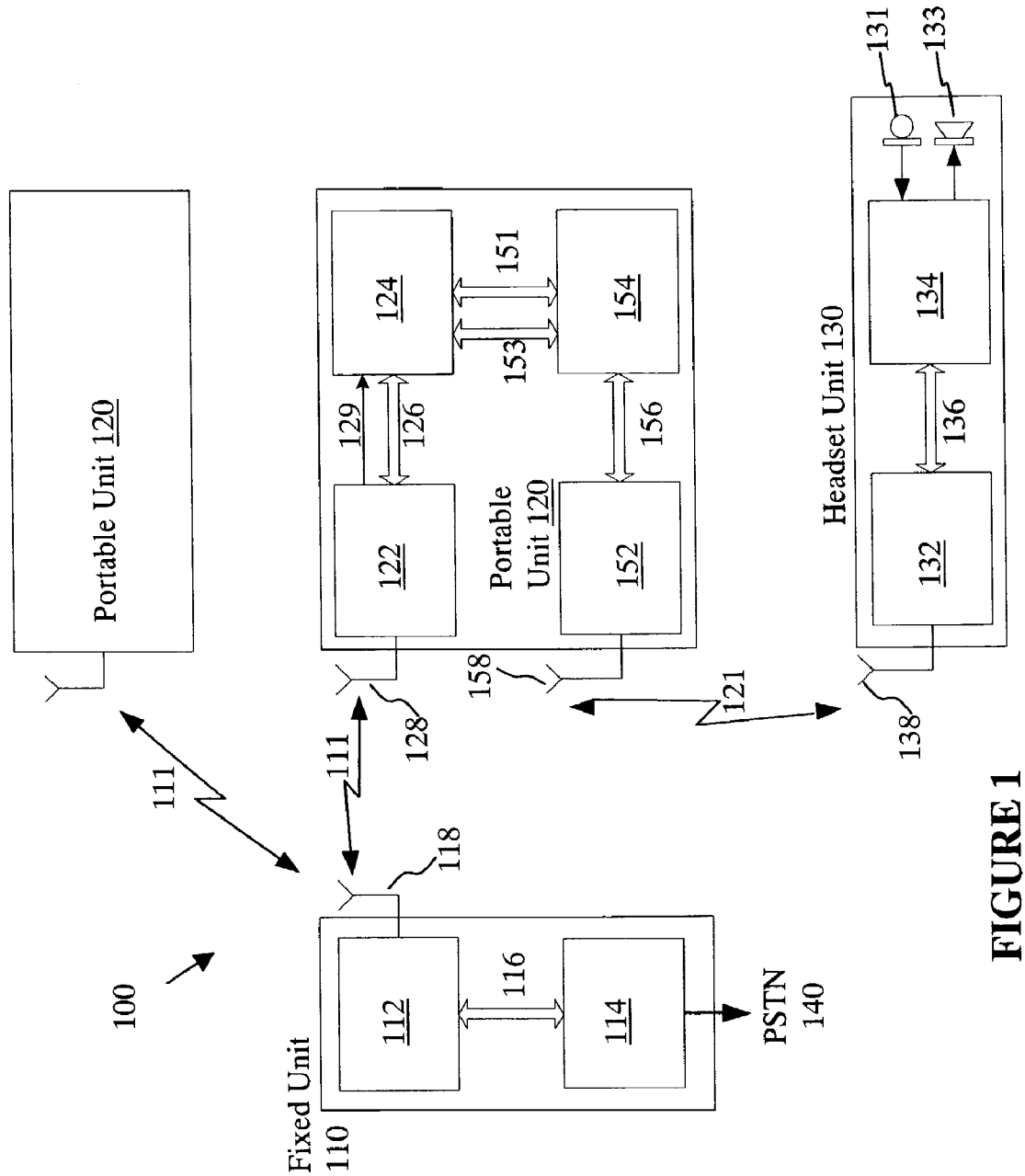
FIG. 1 is a schematic diagram showing various components of a preferred embodiment of the invention.

FIG. 1 is a schematic diagram showing various components of a preferred embodiment of the invention. System 100 supports simultaneous use of up to four time slots in a TDMA scheme between portable units 120 and fixed unit 110. Accordingly, up to four portable units 120 can have simultaneous voice connection with fixed unit 110. In a specific implementation of the invention in which system 100 is a cordless telephone, portable units 120 are the handsets of the cordless telephone and fixed unit 110 is the base unit of the cordless telephone.

System 100 includes fixed unit 110 and portable unit 120. System 100 is configured to communicate with headset unit 130. Fixed unit 110 communicates with portable unit 120 via first link 111, and portable unit 120 communicates with headset unit 130 via second link 121. First link 111 uses a cordless RF link. For example, the known WDCT standard may be utilized to support first link 111. Second link 121 uses a RF link that is different from first link 111. For example, second link 121 may use the known BT technology. It is noted that the present invention is not limited to either the WDCT standard or the BT technology.

Fixed unit 110 is configured to communicate with PSTN 140. Fixed unit 110 includes fixed transceiver 112 and fixed processor 114. Fixed processor 114 is configured to process signals associated with fixed transceiver 112. Fixed transceiver 112 and fixed processor 114 communicate with each other via interface 116. Fixed transceiver 112 is configured to communicate with portable unit 120 via antenna 118. Preferably, fixed transceiver 112 is a known cordless transceiver and interface 116 is a known RF interface.

Portable unit 120 includes first portable transceiver 122 and first portable processor 124. First portable processor 124 is configured to process signals associated with first portable transceiver 122. First portable transceiver 122 and first portable processor 124 communicate with each other via interface 126. Preferably, first portable transceiver 122 is a known cordless transceiver and interface 126 is a known RF interface. First portable transceiver 122 is configured to communicate with fixed unit 110 via antenna 128. Antenna 128 communicates with antenna 118 via first link 111. Preferably, first link 111 is a cordless telephone RF link.

Portable unit 120 further includes second portable transceiver 152 and second processor 154. Second portable processor 154 is configured to process signals associated with first portable transceiver 152. Second portable transceiver 152 and second processor 154 communicate with each other via interface 156. Preferably, second portable transceiver 152 is a BT transceiver. Second portable transceiver 152 is configured to communicate with headset unit 130 via antenna 158. First portable processor 124 and second portable processor 154 communicate with each other. For example, audio interface 151 facilitates exchange of audio information between second portable processor 154 and first portable processor 124. In addition, non-RF related signaling 153 can be exchanged between second portable processor 154 and first portable processor 124. Non-RF related signaling 153 can include, for example, provision of timing information of a system clock associated with second portable transceiver 152.

Headset 130 includes headset transceiver 132 and headset processor 134. Headset processor 134 is configured to process signals associated with headset transceiver 132. Headset transceiver 132 and headset processor 134 communicate with each other via interface 136. Headset processor 134 is in communication with microphone 131 and speaker 133. Headset transceiver 132 is configured to communicate with portable unit 120 via antenna 138. Antenna 138 communicates with antenna 115 via second link 121. Preferably, headset transceiver 132 is a BT transceiver and second link 121 is a BT RF link.

Fixed transceiver 112, fixed processor 114, first portable transceiver 122, and first portable processor 124 are members of a first RF system associated with first link 111. Headset transceiver 132, headset processor 134, second portable transceiver 152, and second portable processor 154 are members of a second RF system associated with second link 121. First portable processor 124 is configured to receive RSSI 129 from first portable transceiver 122. In the preferred embodiment of the invention, the first RF system is a WDCT system and the second RF system is a BT system.

In an alternative embodiment, second portable transceiver 152 and second portable processor 154 can be incorporated within fixed unit 110. In the alternative embodiment, fixed processor 114 and second portable processor 154 are configured to communicate with each other in a manner similar to that associated with communication between first portable processor 124 and second portable processor 154.

In practice, a user of telephone system 100 wears headset unit 130 on his head so that microphone 131 can receive his voice and speaker 133 can deliver sound to his ear. Portable unit 120 can be clipped to his belt or placed in a pocket. Fixed unit 110 is stationed in a building with access to PSTN 140. In this manner, so long as portable unit 120 is within the range of fixed unit 110, communication between fixed unit 110 and portable unit 120 can be facilitated via first link 111. Similarly, headset unit 130 and portable unit 120, both of which are with the user, can communicate with each other via second link 121. Preferably, fixed unit 110 can support four portable units 120.

In a preferred embodiment of the invention, fixed transceiver 112 and first portable transceiver 122 are cordless telephone transceivers (e.g., WDCT transceivers) and second portable transceiver 152 and headset transceiver 132 are BT transceivers. Transceivers 112 and 122 communicate with each other via cordless telephone RF link 111 and transceivers 152 and headset transceiver 132 communicate with each other via Bluetooth RF link 121. In a situation in which each of fixed transceiver 112, first portable transceiver 122, second portable transceiver 152, and headset transceiver 132 is operating in the 2.4 GHz frequency range, one aspect of the invention is to multiplex slots of second portable transceiver 152 and first portable transceiver 122 to avoid mutual interference.

In one exemplary implementation of the invention in which first link 111 is a cordless RF link and second link 121 is a BT RF link, the transmission/receive timing of the first RF system (i.e., the timing used by a WDCT system) is adjusted to avoid mutual interference between first link 111 and second link 121. This allows second portable transceiver 152 (a BT transceiver) and first portable transceiver 122 (a WDCT transceiver) to coexist in portable unit 120.

In such implementation, advantages of the present invention include the following:

Known information about BT wireless technology and WDCT can be used to achieve slot multiplexing and time synchronization;

No coordination between two units is required, i.e., WDCT transceiver 122 uses information from BT transceiver 152 to adjust its time base;

Existing BT and WDCT frame formats can be used without any modifications leading to shorter product development time and cost savings;

The 3.2 KHz BT system clock can be used for time synchronization that allows for very effective implementation of the invention that involves very low processing power, simple implementation, and low cost;

Slot multiplexing along with time synchronization avoids BT front end loading problems, i.e., as WDCT transmitter is not on when BT receiver is on, the BT receiver will not have problem receiving a weak desired signal;

Time synchronization means that 2.4 GHz WDCT transceiver and BT transceiver can co-exist in a close proximity without causing RF front end overloading of the BT transceiver.

Although data rates and the frame formats are different for BT and WDCT air interfaces, there is one commonality between the WDCT and BT frame formats. The total time for one slot in WDCT frame is 1.25 ms (mini seconds) (guard slot plus active slot), and the total time for one transmit plus receive slot in BT is also 1.25 ms. This invention makes use of this common slot timing of WDCT and BT air interfaces to make a complete TDMA system by multiplexing WDCT and BT air interface slots by adjusting timing of WDCT transmit/receive (Tx/Rx) based upon BT system clock.

Figure 2:
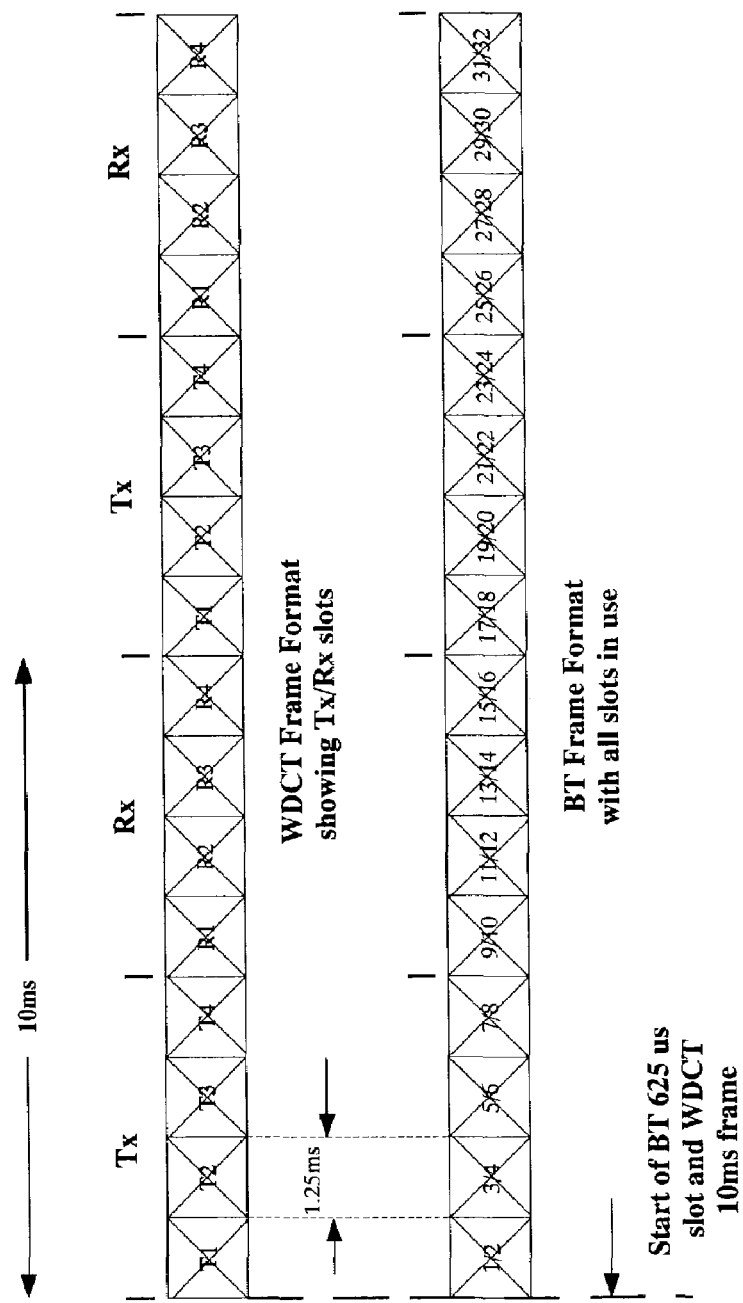
FIG. 2 is a schematic diagram representing a WDCT frame format showing Tx/Rx slots and a BT frame format with all slots in use.

FIG. 2 is a schematic diagram representing a WDCT frame format showing Tx/Rx slots and a BT frame format with all slots in use. The slots marked "X" are used for transmission/reception. It is noted that WDCT frame format supports eight slots (4 Tx and 4 Rx) and allows for four portable units 120 to be connected to fixed unit 110 using TDMA method. As shown in FIG. 2, it is not possible to avoid mutual interference between WDCT and BT transceivers if all the slots are in use in their respective frames.

Figure 3:
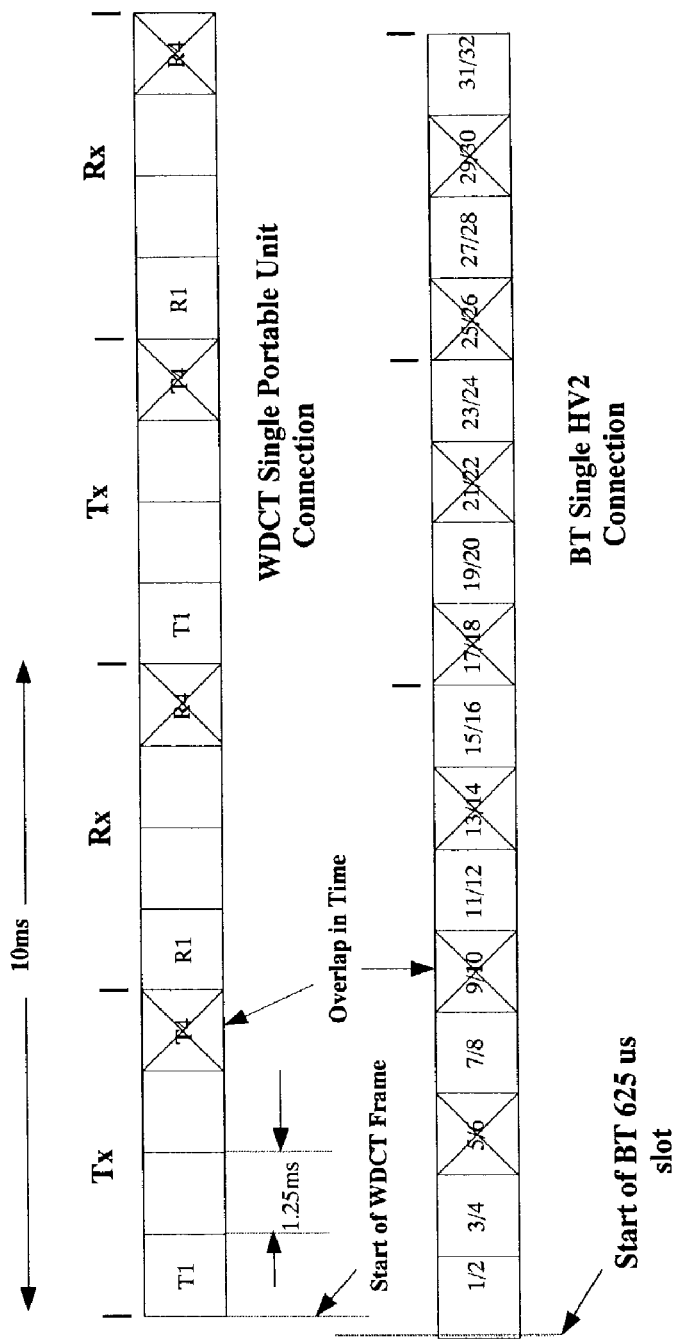
FIG. 3 is a schematic diagram representing a WDCT frame format showing only one bearer (a TX/RX pair) is used and a BT frame format using a BT single HV2 connection.

FIG. 3 is a schematic diagram representing a WDCT frame format showing only one bearer (a Tx/Rx pair) is used and a BT frame format using a BT single HV2 connection. As shown in FIG. 3, there is an overlap in time at slot T4 in the WDCT frame format and at slot 9/10 in the BT frame format. Thus, even when the slots are multiplexed in time between the WDCT and BT transceivers (e.g., first portable transceiver 122 and second portable transceiver 152), it is not possible to avoid mutual interference if there is no time alignment between the WDCT and BT transceivers.

Figure 4:
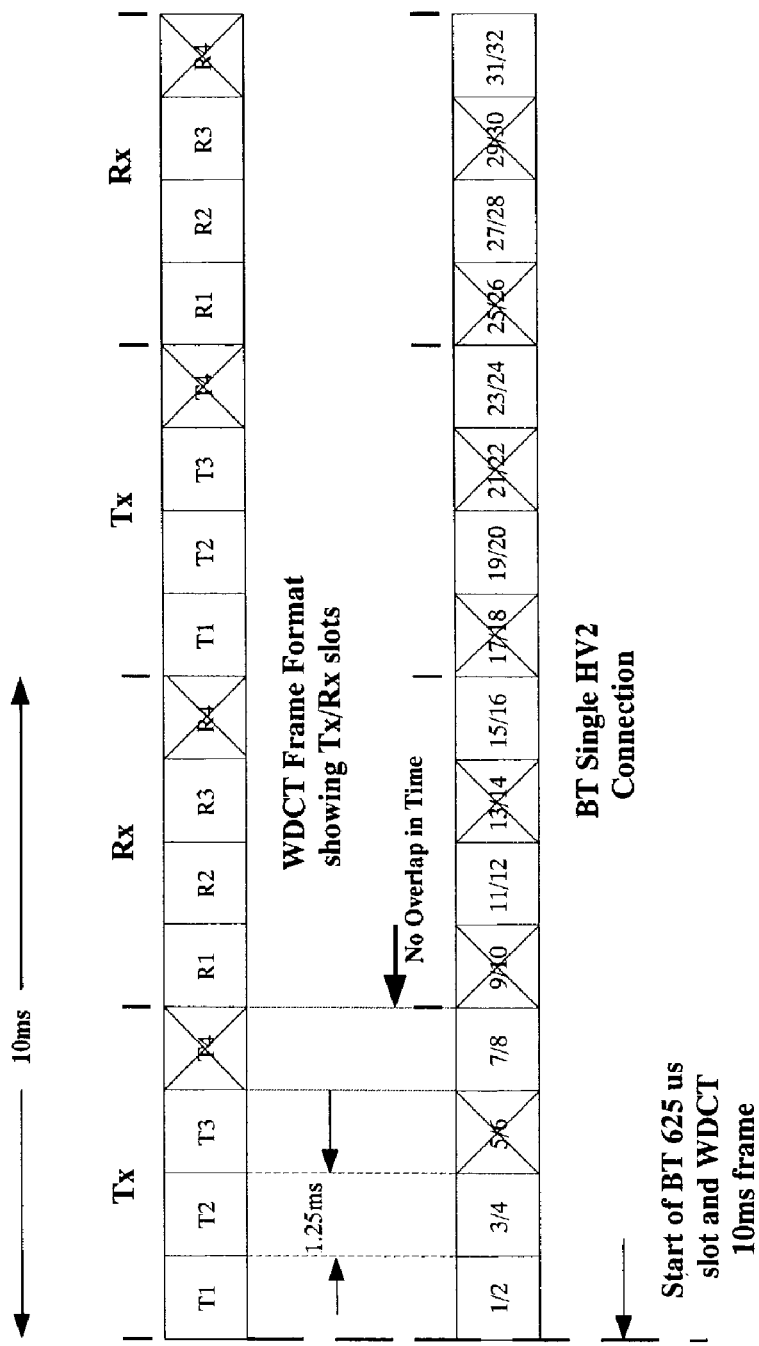
FIG. 4 is a schematic diagram similar to FIG. 3 with time synchronization between the WDCT and BT time slots.

FIG. 4 is a schematic diagram similar to FIG. 3 with time synchronization between the WDCT and BT time slots. FIG. 4 shows that by multiplexing the slot use in time domain and time synchronization between the WDCT and BT transceivers the mutual interference can be avoided.

A number of methods can be implemented to avoid mutual interference between transceivers 152 and 122. For example, the mutual interference can be reduced or avoided by using either the 3.2 KHz BT system clock or over the air synchronization.

Use of the 3.2 KHz BT System Clock

The 3.2 KHz clock is the heart beat of any BT system and drives the master clock counter in BT systems. Time synchronization based upon BT system clock of 3.2 KHz can be implemented as follows. First, the 3.2 KHz clock information is obtained from second portable processor 154 by first portable processor 124. Interface 126, for example, can be used to obtain the clock information. Second, WDCT 2.4 GHz frame is aligned to start with BT master unit time slot. In other words, the start of WDCT 10 ms frame with start of BT master's transmission slot of 625 µs (micro seconds) are aligned. If handset unit 120 is not the master of clock in the system, the clock information will have to be passed to fixed unit 110 to adjust the clock of fixed unit 110 to align the frame start with BT clock.

Figure 5:
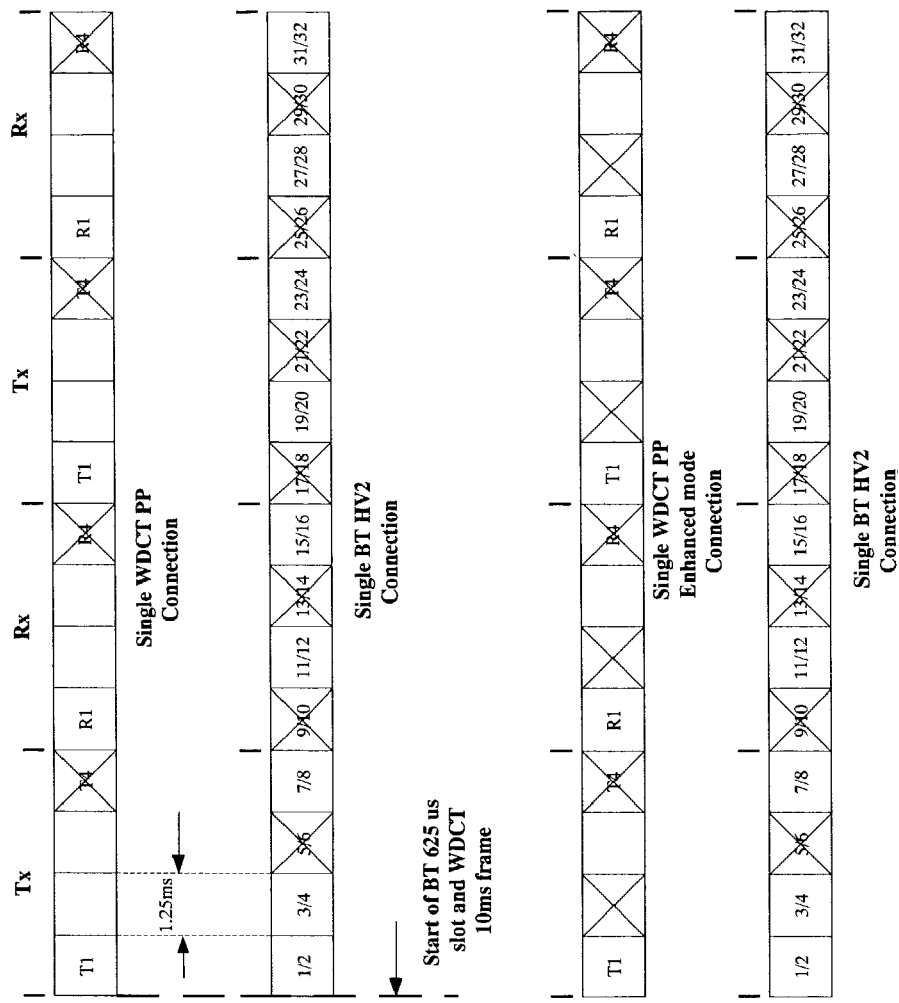
FIG. 5 shows that it is possible to avoid mutual interference between WDCT RF link and BT RF link using frame alignment and multiplexing of slots.

By using WDCT frame synchronization with Bluetooth, mutual interference can be avoided. As shown in FIG. 5, mutual interference between WDCT and BT can be avoided using frame alignment. Preferably, the BT master selects HV2 packet for audio transmission with Tsco=4. Each HV2 packet in BT carries 2.5 ms of audio. There are other ways of multiplexing the slots to avoid interference. This invention is not limited to only the combination described above.

Figure 6:
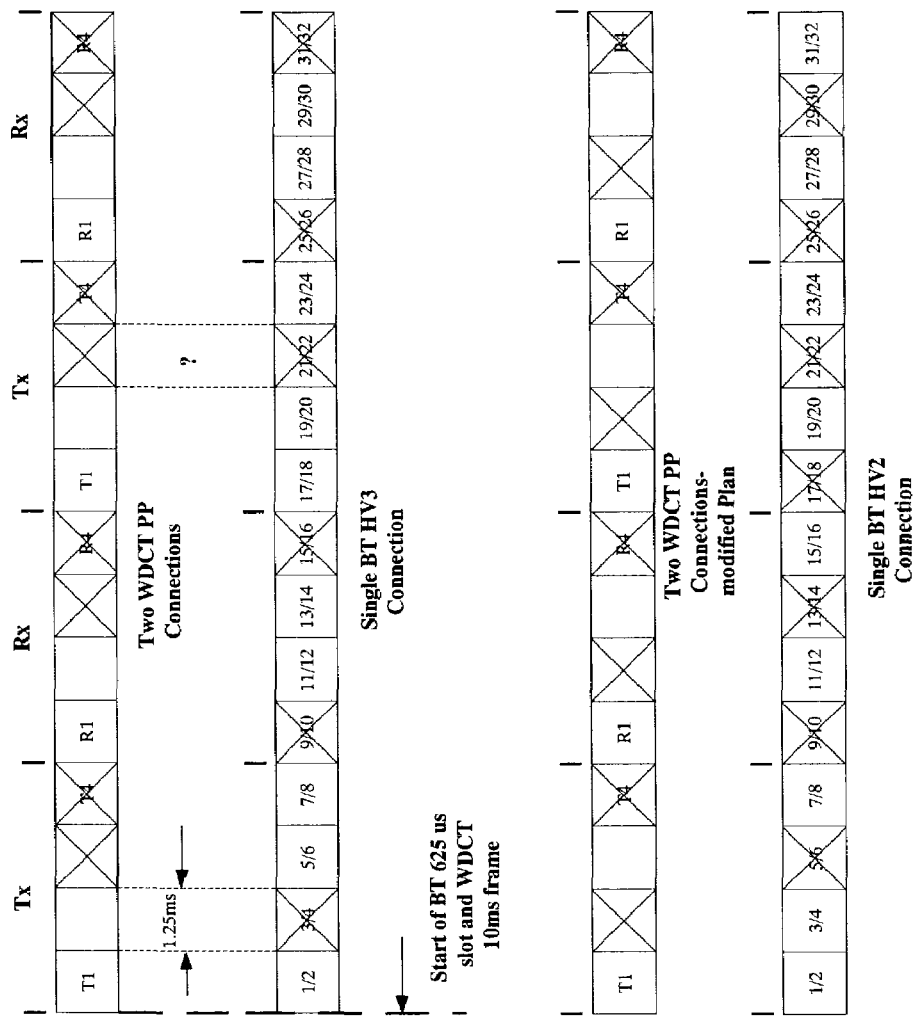
FIG. 6 shows that it is not possible to avoid mutual interference between BT RF link and WDCT RF links by using the highest available slots in WDCT even when DV3 SCO packet is used in the BT link.

FIG. 6, shows that it is not possible to avoid BT mutual interference with WDCT links by using the highest available slots in WDCT even when DV3 SCO packet is used in the BT link. However, by making minor modifications to the WDCT link manager, i.e., the slot allocation master, mutual interference with BT link can be avoided when one WDCT portable unit 120 is used in enhanced mode or two WDCT portable units 120 are used in non-enhanced mode.

Therefore, in connection mode mutual interference between BT and WDCT link can be avoided if the WDCT frame and BT slot starts can be aligned based upon the BT clock. This scheme works if the number of portable units 120 is limited to a maximum of two, or when only of the portable units is in an enhanced connection at a time.

Over The Air Synchronization

The same goal can be achieved by making use of WDCT transceiver 122 to achieve over the air synchronization. Time synchronization can be achieved by measuring RSSI in 2.4 GHz WDCT transceiver 122 to estimate BT transmit timing associated with BT transceiver 152. This can be accomplished by, for example, using RSSI received by WDCT transceiver 122 and convert this information into time domain to estimate start of BT transceiver 152's slot and adjust WDCT transceiver 122 timing to avoid mutual interference (time synchronize). This is possible because the bandwidth of WDCT transceiver 122 is 864 KHz and BT transceiver 152 is roughly 1 MHz.

For the purpose of measuring RSSI, BT signal can be received on WDCT transceiver 122. At start up or any other time when BT transceiver 152 is transmitting in a normal hopping fashion, WDCT transceiver 122 uses all or one or more of its free slots to receive and stay on a single channel frequency long enough to capture the BT transmission. Once BT transceiver 152 hops on the same frequency, the signal strength of the received signal is compared with a reference voltage to convert the information into a time domain signal. WDCT transceiver 122 uses this information to adjust its slot timing so that it is not transmitting at same time when BT transceiver 152 is transmitting.

Accordingly, system 100 can work in the following manner:

1. As the distance between BT transceiver 152 and WDCT transceiver 122 are fixed in portable unit 120, the range of expected RSSI value is known, which can be used to make positive identification of the desired BT transceiver 152.
2. The reference voltage for the comparator can be adjusted based upon expected range of RSSI voltage.
3. The WDCT processor 124 generates an interruption or an indication which can be used to adjust frame timing.

The process can be repeated a number of times or only once depending upon the desired accuracy of the synchronization required.

Figure 7:
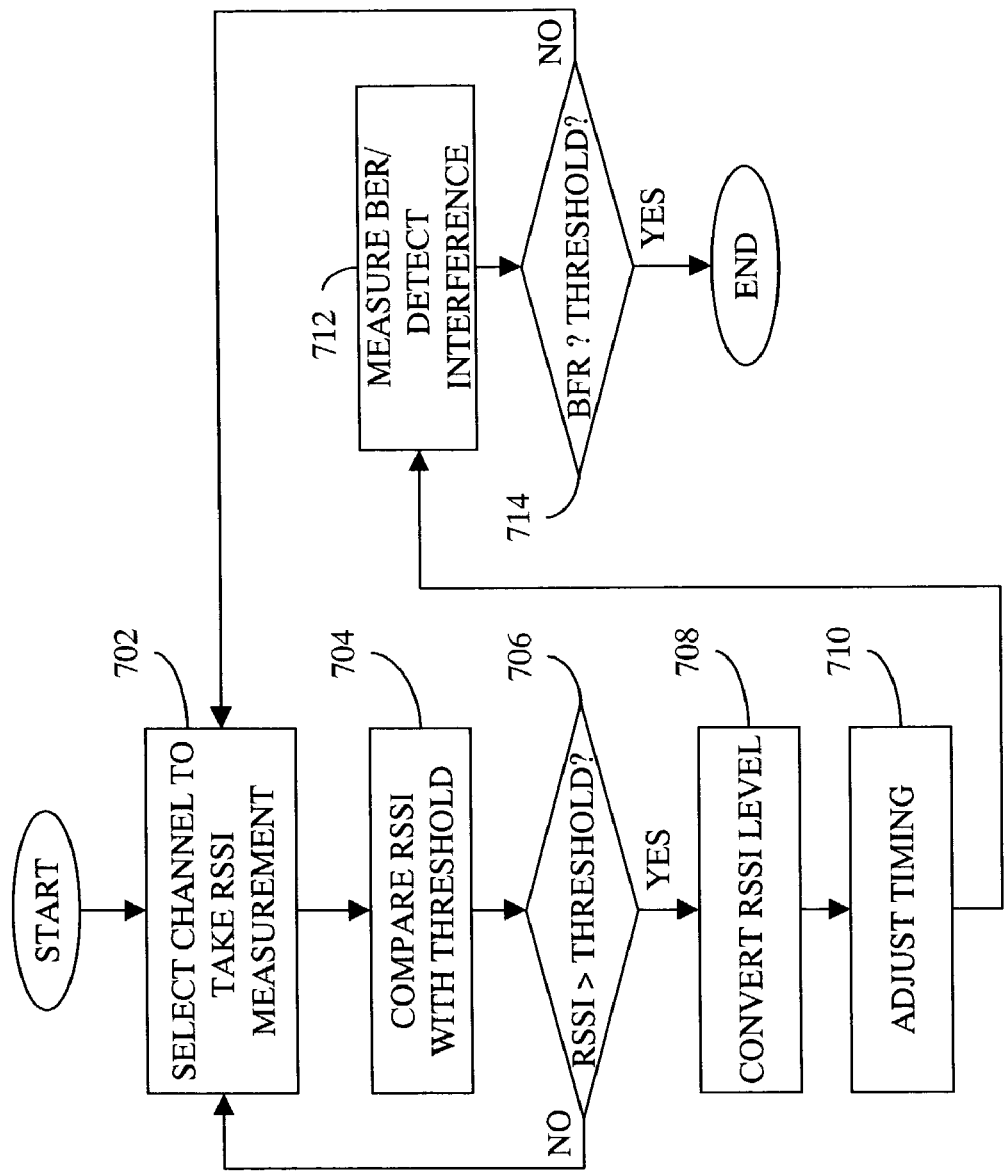
FIG. 7 is a flow diagram showing one way of performing a spectrum monitoring that can be used to implement a preferred embodiment of the invention.

FIG. 7 is a flow diagram showing one way of performing a spectrum monitoring that can be used to implement one embodiment of the invention. It is noted that one of portable unit 120 and the fixed unit 110 can monitor the RF spectrum to gather transmit timing information of interfering signals. For clarity, in the discussion below regarding FIG. 7, interfering signals are generated by second portable transceiver 152 and headset transceiver 132 (second link 121), and first portable processor 124 is configured to implement the invention. However, any one of fixed processor 114, first portable processor 124, and second portable processor 154 can be configured to execute the logic disclosed. It is noted that there are other methods that can be implemented. Gathering or obtaining timing information of the second RF system is just one way.

In step 702, first portable processor 124 selects a channel for taking an RSSI measurement.

In step 704, first portable processor 124 compares the RSSI with a threshold. The threshold can be predetermined and stored in a memory accessible to first portable processor 124 or it can be programmable. As the distance between second portable transceiver 152 and first portable transceiver 122 is fixed in portable unit 120 or fixed unit 110, the expected RSSI level is known, and the threshold could then be set based upon lab measurements to convert this into a timing signal by comparing it with a fixed threshold in a comparator.

In step 706, if the RSSI is greater than the threshold, the process goes to step 708. Otherwise, the process returns to step 702 and a different channel is selected and a new RSSI measurement is taken.

In step 708, the RSSI level is converted by first portable processor 124 into an interfering signal transmit timing associated with second link 121.

In step 710, using the interfering signal transmit timing of the previous step, transmit/receive timing is used to estimate transmit timing associated with second portable transceiver 152. Further, timing of first portable transceiver 122 can be adjusted by first portable processor 124 to avoid interference in time domain/multiplexing of TDMA slots of transceivers 122 and 152. First portable transceiver 122 can then use the adjusted transmit/receive timing to achieve multiplexing of the slots between first portable transceiver 122 and second portable transceiver 152 to avoid interference.

In step 712, first portable processor 124 detects interference between first portable transceiver 122 and second portable transceiver 152. The detection can be done, for example, by measuring the BER (Bit Error Rate). If an interference is detected, e.g., the RSSI level is above the specified threshold, the bearer (Tx and Rx slot) position may be moved with respect to start of the frame and/or a different bearer might be selected to avoid collision. The interference can be detected by the first RF system or the second RF system and the BER is one of the possible methods that could be employed.

In step 714, if the BER is greater than the threshold or no interference has been detected for a certain amount of time, the process returns to step 702. This time could be adjusted or varied by the processor depending upon the application. Otherwise, the RF spectrum monitoring process ends.

Preferably, first portable transceiver 122 can be configured to wake up periodically from a standby mode to sniff the RF spectrum to utilize unused slots to monitor the RF spectrum to recognize other users when in talk mode.

Figure 8:
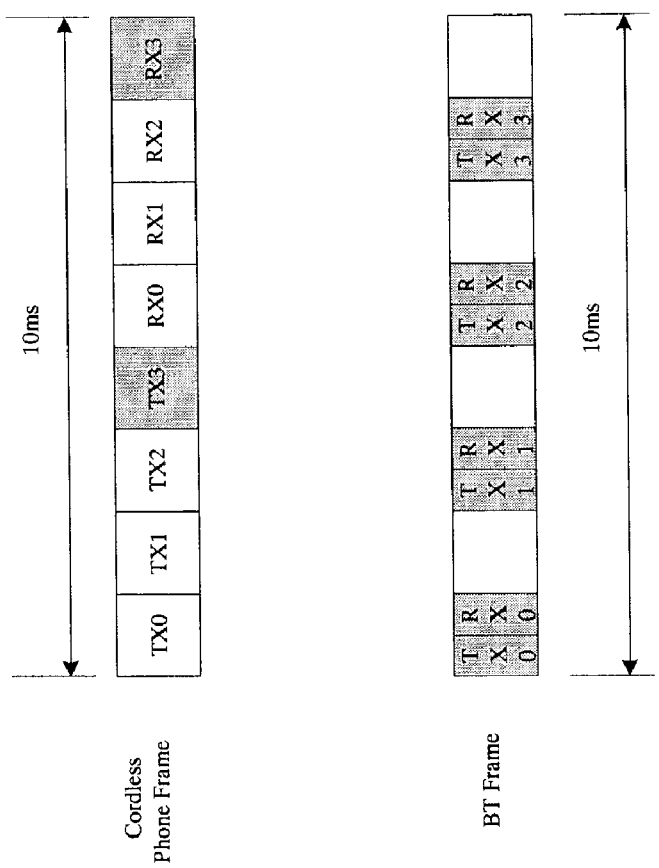
FIG. 8 shows a cordless telephone frame structure with one voice connection at the fourth bearer (the TX3 and RX3 pair) and a BT frame structure type HV2 used for one voice connection.

FIG. 8 shows a cordless telephone frame structure with one voice connection at the fourth bearer (the TX3 and RX3 pair) and a BT frame structure type HV2 used for one voice connection. In the instance shown in FIG. 8, the slots that are used for active cordless telephone voice connection are TX3 and RX3. Each Rx-Tx slot pair or bearer in TDMA frame has its own hop sequence. Each bearer is associated with one voice connection.

A BT transceiver (e.g., second portable transceiver 152) may employ different slot structure for voice connections. For example, as shown in FIG. 8, the HV2 type SCO slots connection can be used. The WDCT or cordless voice connection is established by using shaded slots TX0/RX0, TX1/RX1, TX2/RX2, and TX3/RX3. In the preferred embodiment, the frequency hopping rate of cordless transceiver is 100 hops/second and the BT hop rate is 1600 hops/second.

In the preferred embodiment, first portable transceiver 122 (the cordless transceiver) may employ one of the following strategies to avoid interference:

Select a different slot for transmission/reception, e.g., select slot TX1/RX1 instead of TX3/RX3 as shown in FIG. 8; and Employ CSMA (Carrier Sense Multiple Access) technique to avoid start of transmission when other users are transmitting, e.g., move frame/slot start to avoid simultaneous transmission and/or reception.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a fixed unit having a fixed transceiver;
a portable unit having a portable transceiver, wherein the portable transceiver and the fixed transceiver communicate via a first RF link;
an additional transceiver coupled to one of the fixed unit and the portable unit, wherein the additional transceiver facilitates communication between the portable unit and a headset unit via a second RF link;
a processor coupled to one of the fixed transceiver, the portable transceiver, and the additional transceiver, wherein the processor is configured to avoid interference between the first RF link and the second RF link,
wherein the interference between the first RF link and the second RF link is avoided by multiplexing time slots associated with the first RF link and the second RF link,
wherein the multiplexing is performed using timing information received from other signals from which the timing information can be derived, and
wherein the multiplexing is performed using RSSI to derive timing information of the additional transceiver.

2. The system of claim 1, wherein the fixed unit is configured to communicate with a telephone network and the fixed unit and the portable unit are a base unit and a cordless handset of a cordless telephone, respectively.

3. The system of claim 1, wherein each of the fixed transceiver and the portable transceiver is a cordless telephone transceiver.

4. The system of claim 3, wherein the cordless telephone transceiver is a WDCT transceiver.

5. The system of claim 1, wherein the headset unit is a Bluetooth headset and the additional transceiver is a Bluetooth transceiver.

6. The system of claim 1, wherein the multiplexing is performed using timing information received from a system clock associated with the second RF link.

7. The system of claim 1, wherein the multiplexing is performed using over the air synchronization between the first portable transceiver and the second portable transceiver.

8. A portable unit of a cordless telephone comprising:
a first transceiver configured to communicate with a fixed unit of the cordless telephone via a first RF link;
a first processor coupled to the first transceiver, wherein the first processor is configured to adjust timing information associated with the first transceiver; and
a second transceiver configured to communicate with a headset via a second RF link,
wherein the first processor adjusts time slots associated with the first transceiver to avoid interference between the first RF link and the second RF link, and wherein the first processor is further configured to determine an RSSI that can be used to estimate frame start of the second transceiver associated with the second RF link.

9. The portable unit of claim 8, further comprising a second processor coupled to the second transceiver, wherein the second processor is configured to provide timing information associated with the second transceiver to the first processor.

10. The portable unit of claim 9, wherein the first processor uses the timing information to align frame start of the first transceiver to avoid the interference.

11. The portable unit of claim 8, wherein the first processor uses the RSSI to adjust transmit/receive timing of the first transceiver to avoid the interference.

12. A method of avoiding interference, between two communications systems comprising:

obtaining timing information associated with a Bluetooth RF link between a handset of a cordless telephone and a Bluetooth headset; and aligning frame start of a cordless RF link between the handset and a base unit of the cordless telephone based on the timing information to avoid mutual interference between the Bluetooth RF link and the cordless RF link, wherein the timing information is based on RSSI measured over the cordless RF link.

13. The method of claim 12, wherein the aligning involves timing a start of the cordless RF link's 10 ms frame with a start of the Bluetooth RF link's time slot of 625 μs.

14. The method of claim 12, wherein the Bluetooth RF link uses an HV2 packet for audio transmission with Tsco=4 and the HV2 packet carries 2.5 ms of audio.

* * * * *